United States Patent [19]

Grieves et al.

[11] 4,429,710
[45] Feb. 7, 1984

[54] SLURRY GATE VALVE

[75] Inventors: Robert G. Grieves, Tampa; Roscoe Richter, Lakeland, both of Fla.

[73] Assignee: GIW Southern Valve, Inc., Grovetown, Ga.

[21] Appl. No.: 433,035

[22] Filed: Oct. 6, 1982

Related U.S. Application Data

[63] Continuation-in-part of Ser. No. 235,420, Feb. 17, 1981, abandoned.

[51] Int. Cl.³ .................... F16K 37/00; F16K 3/00
[52] U.S. Cl. .................... 137/375; 137/242; 137/556; 251/285; 251/328
[58] Field of Search .................... 137/375, 242, 556; 251/285, 328, 329

[56] References Cited

U.S. PATENT DOCUMENTS

| 2,683,581 | 7/1954 | Rovong | 251/328 |
| 2,883,148 | 4/1959 | Williams | 251/328 |
| 2,919,590 | 1/1960 | Griswold | 137/556 |
| 3,000,608 | 9/1961 | Williams | 251/328 |
| 3,170,668 | 2/1965 | Aulisa | 137/556 |
| 4,136,709 | 1/1979 | Rogers et al. | 137/375 |

FOREIGN PATENT DOCUMENTS

| 675565 | 12/1963 | Canada | 137/242 |
| 762830 | 12/1956 | United Kingdom | 251/328 |
| 1003877 | 9/1965 | United Kingdom | 251/285 |

Primary Examiner—A. Michael Chambers

[57] ABSTRACT

A slurry gate valve is disclosed for controlling the flow of slurry along a pipeline. The gate valve comprises a cylindrical conduit portion and a gate housing portion. The cylindrical conduit portion includes a first and second annular bolt flange defining first and second terminals disposed at opposite ends of the cylindrical conduit portion. A first and a second metallic sleeve liner, respectively, extend inwardly from the bolt flanges and define therebetween a gate receiving slot. The gate housing portion is secured to the cylindrical portion and houses a gate guide track which is in planar alignment with the gate receiving slot. A gate has a lower portion which cooperates with the gate receiving slot in substantially fluid tight relationship therewith. The gate travels from a closed position to an open position wherein the gate substantially fully withdrawn from the conduit portion. The gate valve further includes means for driving the gate between the open and the closed position. In a further embodiment of the invention, the first and the second sleeve liners each include an annular channel and an undercut key portion for the reception of an annular wiping seal permanently formed therein. The wiping seal extends outwardly from the annular channel and sealingly engages adjacent surfaces of the gate to inhibit seepage of the slurry thereby.

7 Claims, 13 Drawing Figures

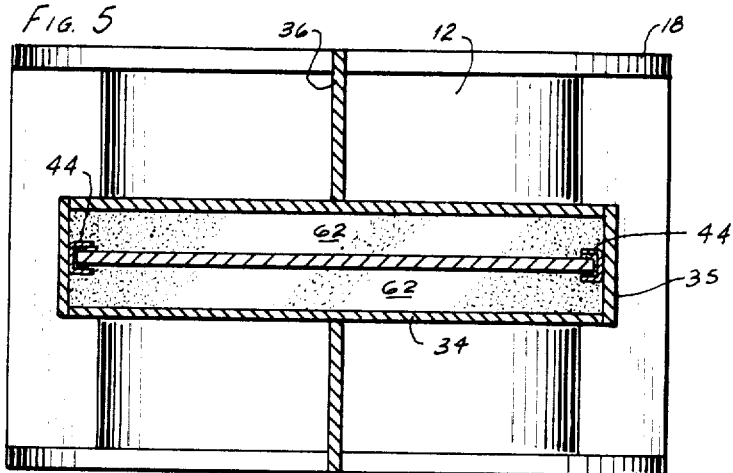
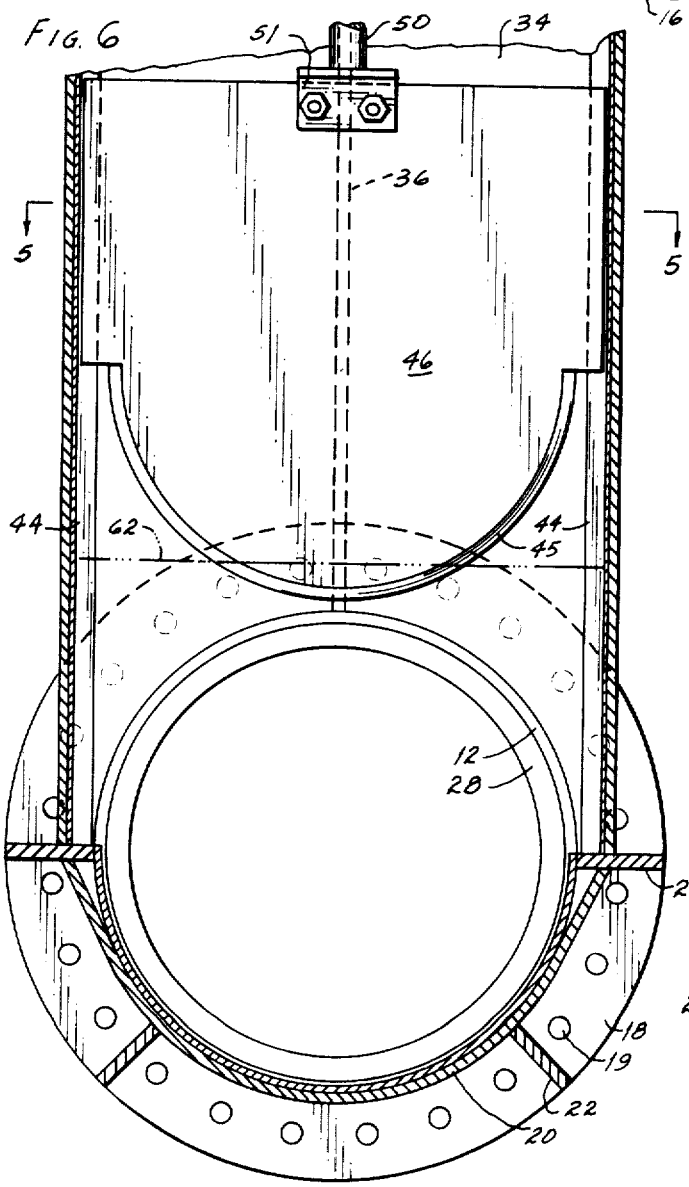
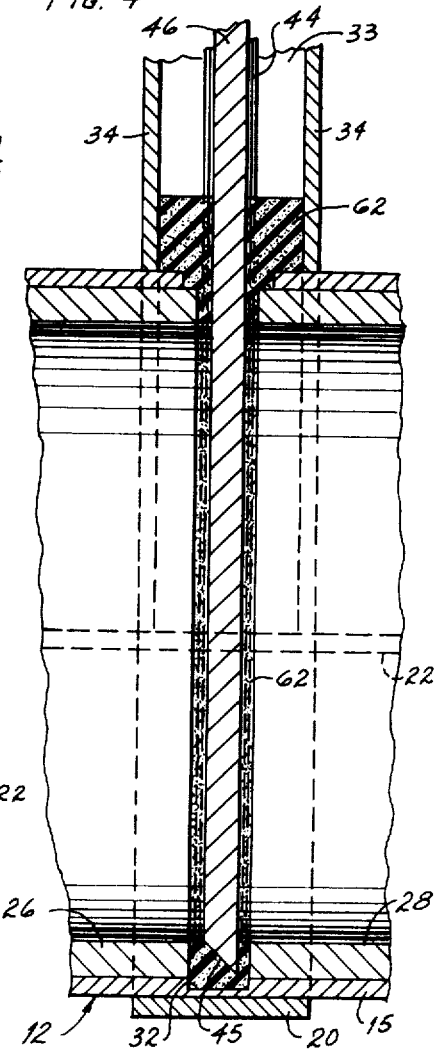

SLURRY GATE VALVE

CONTINUATION-IN-PART

This is a continuation-in-part of U.S. patent application Ser. No. 235,420 filed Feb. 17, 1981, now abandoned.

BACKGROUND OF THE INVENTION

1. Field of the Invention

This invention is directed primarily towards gate valves which are intended for fully closed obstruction of a conduit or fully opened flow.

2. Background of the Invention

Various type of gate valves have been devised in the prior art for use in highly abrasive slurry pipelines such as might be used in the transportation of coal wherein finely ground coal is mixed with water to form a heavy flowable slurry or for the transportation of phosphate ores as mined and pumped from surface mines.

These materials are abrasive and are also contaminated with foreign matter such as small stones and crushed rock, flint and prehistoric animal skeletons. These and like material are very abrasive and tend to erode away the cylindrical portion and gate of gate valves to the extent that the gate valve malfunctions.

The transported material is usually under sufficiently high pressure that the liquid component will seek escape through any crevice.

There have been a great variety of pipeline and valve structures wherein linings of almost every imaginable type have been employed to reduce the rate of pipe line failure due to the abrasive action of the slurry.

Most of the known prior art for resisting abrasion also includes the concept of resisting corrosive material. Butterfly valves are shown in U.S. Pat. No. 3,913,610 and plug valves of exotic metals or liners are illustrated by U.S. Pat. Nos. 3,630,224 and 3,916,943. U.S. Pat. Nos. 3,334,650 and 4,136,709 both disclose valve structures that include abrasion resistant liners. However, both of these patents refer to ball valve structures and make no reference to the application of abrasive and chemical resistant liners for slurry gate valves. Due to the high cost of manufacture of slurry gate valves and more importantly because of the extremely high cost of replacing the same, a need has existed in the art for a slurry gate valve of improved reliability. Replacement or repair of a slurry gate valve necessitates down time in a commercial operation while the faulty valve is pulled out of line either for repair or replacement of the same. Therefore, it is the primary object of this invention to provide a slurry gate valve that overcomes the aforementioned inadequacies of the prior art gate valves and provides an improvement which significantly contributes to the ease with which such a gate valve can be manufactured and repaired.

A further object of the present invention is the provision of an improved seal for a gate valve for which seal may be readily replaced or repaired on location.

Another object of the invention is the provision of an improved interfit which is accomplished by using an abrasive resistant lining insert in a dual function. Firstly, the lining is a tubular insert for improved construction and secondly the lining defines a gate sealing and receiving slot.

Another object of this invention is to provide a slurry gate valve in which the cylindrical conduit portion includes a sleeve liner of abrasion resistant material.

Another object of this invention is the provision of a slurry gate valve in which resinous sealant sealingly engages the entire periphery of the gate when the gate is in the first or closed position.

Another object of the present invention is the provision of a transparent cover for the top portion of the stem to prevent the egress of deleterious matter within the gate driving means and to indicate the position of the gate.

Another object of the present invention is the provision of a gate of highly abrasive-resistant alloy.

Another object of the present invention is the provision of an annular channel and adjacent undercut key portion disposed within each sleeve liner for an annular wiping seal which sealingly engages an adjacent surface of the gate.

Another object of the invention is the provision of a method of forming an annular wiping seal within each sleeve liner in which a mold is positioned adjacent to the inward face of the sleeve liner and a resinous sealant is poured through an annular passage of the mold into the annular channel and key portion to cure therein.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention within the scope of the disclosure. Particularly with regard to the use of the invention described herein, this should not be construed as limited to slurry gate valves but should include all gate valves and the like.

SUMMARY OF THE INVENTION

The slurry gate valve of the present invention is defined by the appended claims with a specific embodiment shown in the attached drawings. For the purpose of summarizing the invention, this invention relates to a slurry gate valve of the type normally operating in the fully open or fully closed condition. The gate valve comprises a cylindrical conduit portion and a gate housing portion, and a first and a second annular bolt flange defining first and second terminals disposed at opposite ends of the cylindrical portion. The first and the second flanges each have a planar face for connection to a mating pipe flange. A first and a second sleeve liner each have a outer end face lying in the plane defined by the first and second bolt flanges, respectively. The sleeve liners extend from said bolt flanges within the cylindrical conduit portion and each liner includes an inner end face. The inner end faces are spaced from one another within the cylindrical conduit portion and define a gate receiving slot therebetween. The gate housing portion is secured to the cylindrical conduit portion and includes a gate guide track which is in planar alignment with the gate receiving slot. The gate includes a path side face guide edges to ride within the guide track. The gate has a path of travel from a first or closed position in which the gate is disposed within the gate receiving slot in fluid blocking relationship to a second or open position in the gate housing portion substantially fully withdrawn from the conduit portion. The slurry gate valve also includes means for driving the gate between the first and the second position.

In a further embodiment of the present invention, each of the sleeve liners includes an annular channel and an adjacent undercut key portion which extends radially outwardly relative to the adjacent annular channel. An annular wiping seal is disposed within the annular channel and is locked therein by the undercut key portion. The wiping seal extends outwardly from the annular channel and sealingly engages an adjacent surface of the gate to inhibit seepage of slurry between the surfaces of the gate. The annular wiping seal is formed by means of a mold having an annular planar surface which cooperates with the inner end face of the sleeve liner. Resinous sealant is poured through an open passage defined by the mold into the annular channel and undercut key portion. The resinous sealant is cured and the mold is removed from adjacent the sleeve liner to provide an annular wiping seal which extends outwardly away from the annular channel and which is locked relative to the sleeve liner by the undercut key portion.

BRIEF DESCRIPTION OF THE DRAWINGS

For a fuller understanding of the nature and objects of the invention, reference should be had to the following detailed description taken in conjunction with the accompanying drawings in which:

FIG. 4 is an enlarged fragmentary section taken along line 4—4 of FIG. 2;

FIG. 5 is a section taken along line 5—5 of FIG. 6;

FIG. 6 is an enlarged fragmentary section of the lower portion of the gate valve with the gate in the second position;

Similar reference characters refer to similar parts throughout the several views of the drawings.

DETAILED DESCRIPTION

Figure 1:
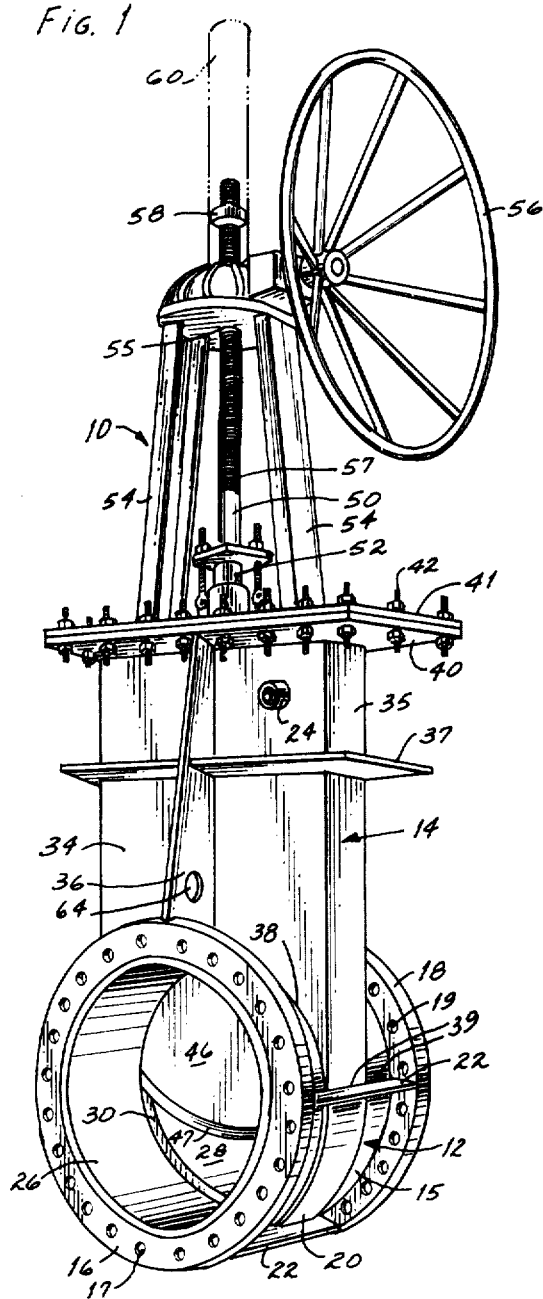
FIG. 1 is a perspective view of a slurry gate valve with the gate partially opened.

The slurry gate valve of FIG. 1 is indicated by general reference character 10. The valve 10 comprises a cylindrical conduit portion 12 and a gate housing portion 14. The conduit portion generally designated 12 comprises a pipe section 15 having a first annular bolt flange 16 defining a first terminal at one end of the pipe section 15. The first annular bolt flange 16 defines a first plurality of bolt holes 17 in order that a mating pipe flange (not shown) may be abutted to the planar face 17A of the first annular bolt flange 16 and secured thereto by means of bolts (not shown) passing through the mating flanges. The opposite end of the pipe section 15 likewise includes a second annular bolt flange 18 defining a second terminal. The second flange 18 also defines a second plurality of bolt holes 19 to attach the flange 18 to the planar face (not shown) of a mating pipe flange.

Figure 3:
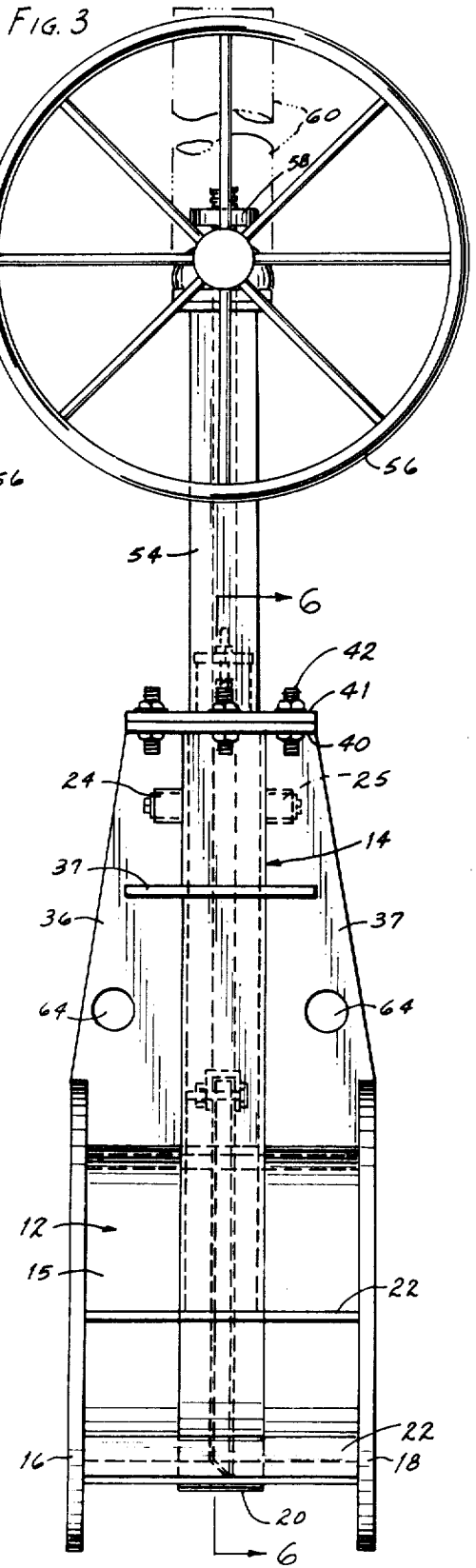
FIG. 3 is a side elevational view of the valve.
Figure 8:
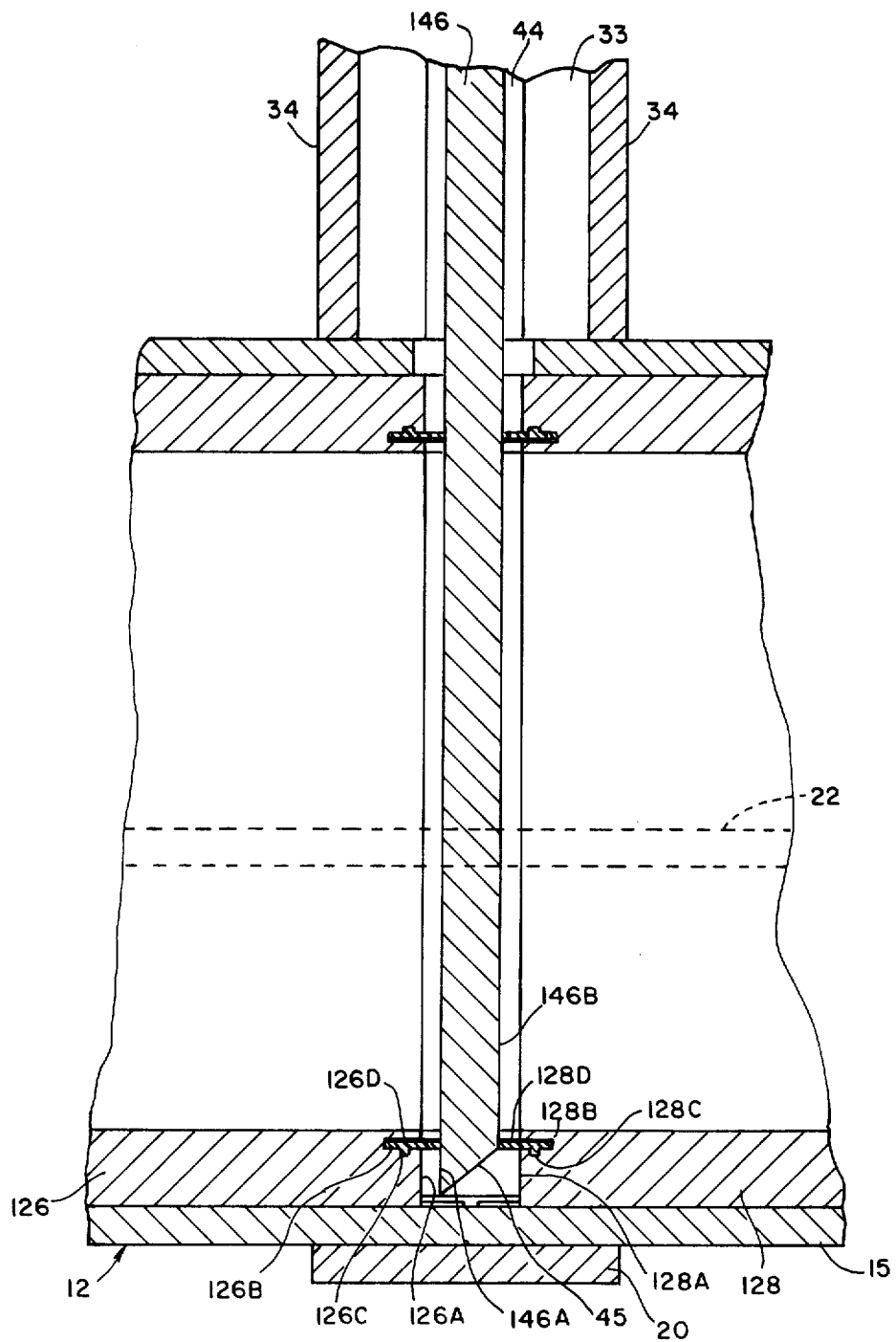
FIG. 8 is a side sectional view of a further embodiment of the present invention.
Figure 9:
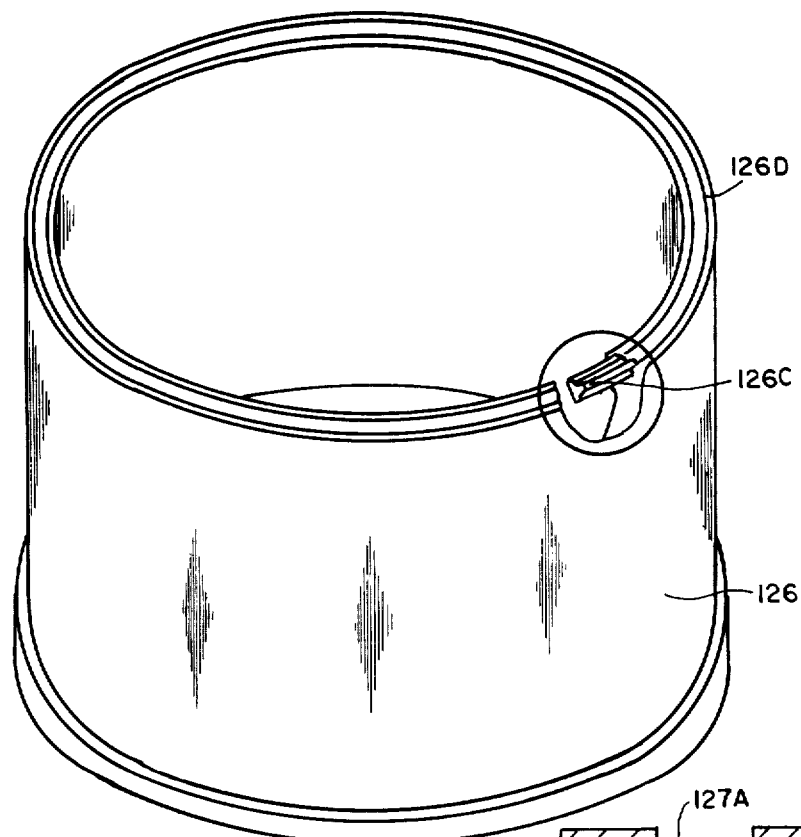
FIG. 9 is a perspective view of the sleeve liner and annular wiping seal shown in FIG. 8.
Figure 10:
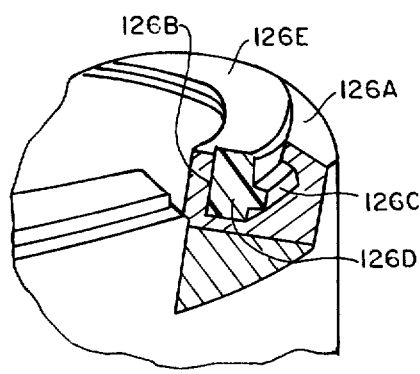
FIG. 10 is a perspective view of an enlarged fragmentary section shown in FIG. 9.

Reinforcement flanges 22 which extend between the two annular bolt flanges and a lower body reinforcement plate 20 which may be seen best in FIGS. 3 and 4, complete the strength reinforcement of the pipe section 15.

The cylindrical conduit portion further includes a first sleeve liner 26 and a second sleeve liner 28 which are resistant to abrasion. The first and second sleeve liners 26 and 28, respectively, are chemical resistant.

The first sleeve liner 26 has a first outer end face 29 shown more particularly in FIG. 1 lying in the plane defined by the bolt flange 16. The body of the sleeve 26 extends into the cylindrical conduit portion 12 to less than half the length of the conduit portion 12.

The second sleeve liner 28 also has a first outer end face 29A shown more particularly in FIG. 3 lying in the plane defined by the second bolt flange 18. The sleeve 28 extends into the conduit portion 12 a distance less than halfway through the cylindrical portion 12.

Each of the sleeve liners 26 and 28 further include an inner end face 29B and 29C, respectively, remote from the respective faces 29 and 29A. Therefore, the inner end faces 29B and 29C of the sleeves 26 and 28 are spaced from one another in opposed relationship within the conduit portion 12 to thereby establish a gate receiving slot 30 shown more particularly in FIG. 1.

FIG. 4 illustrates a groove 32 which is machined into the lower portion of the pipe section 15 in alignment with the gate receiving slot 30.

The gate housing portion 14 is defined by side walls 34 and end walls 35. The housing may be cast but the preferred embodiment now manufactured is of plate and welded construction. Thus the housing portion 14 is preferably reinforced as illustrated by vertical braces 36 and horizontal ribs 37.

The lower portion of the side walls 34 define semicircular recesses which cooperate with the cylindrical conduit portion 12. The gate housing portion 14 is then secured to the conduit portion 12 by a weld seam 39.

The top of the gate housing portion 14 includes a top flange 40 which cooperates with and is closed by a cap plate 41. It is preferable to insert a sealing gasket (not shown) between the top flange 40 and the cap plate 41 before closing the gate housing portion 14 with the cap plate 41. Matching bolt holes and a plurality of bolts 32 encompass the periphery of the mated top flange 40 and cap plate 41. The bolts 42 are closely spaced in order to ensure complete closure even though pressure may be developed in the gate housing portion 14 by fluid pressure from the pipeline.

Guide tracks 44, shown more particularly in FIGS. 5 and 6, are secured to the end walls 35 of the gate housing portion 14 and a gate 46 is guided along a vertical path by the two guide tracks 44.

A transverse slot 46A, shown more particularly in FIG. 4 is cut into the upper portion of the cylindrical conduit portion 12 in order to allow the gate 46 to descend into an obturating position within the pipe section 15. The transverse slot 46A formation is shown in FIG. 6 to extend to one-half of the circumference of the conduit portion 12.

Figure 7:
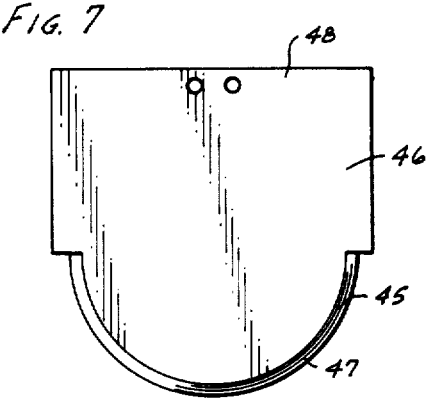
FIG. 7 is a side elevational view of the gate.

The gate 46 is preferably of highly abrasive-resistant material available from various commercial steel manufacturers. FIG. 7 illustrates one gate embodiment in which a semi-circular portion 47 is configured to fit into the gate receiving slot 30 of the cylindrical conduit portion 12 in a substantially fluid tight relationship and has opposed side face guide edges 47A of a rectangular upper portion 48. The distance between the opposed side face edges 47A is such that the gate 46 rides along the guide tracks 44. In the embodiment shown in FIG. 7, the guide tracks 44 are spaced apart to a distance greater than the external diameter of the pipe section 15. Therefore, the rectangular upper portion 48 has a width greater than the diameter of the semi-circular lower portion 47. Shoulders 48A disposed between the semi-circular lower portion 47 and the rectangular upper portion 48 contact the opposed ends of the gate receiving slot 30 of the cylindrical conduit portion 12. However, in the preferred embodiment of the gate 46A as shown in FIG. 7A, the width of the rectangular upper portion 48 is the same as the diameter of the semi-circular portion 47.

Figure 7A:
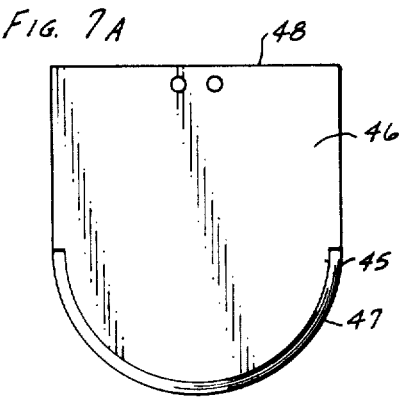
FIG. 7A is a side elevational view of an alternate preferred embodiment of the gate.
Figure 2:
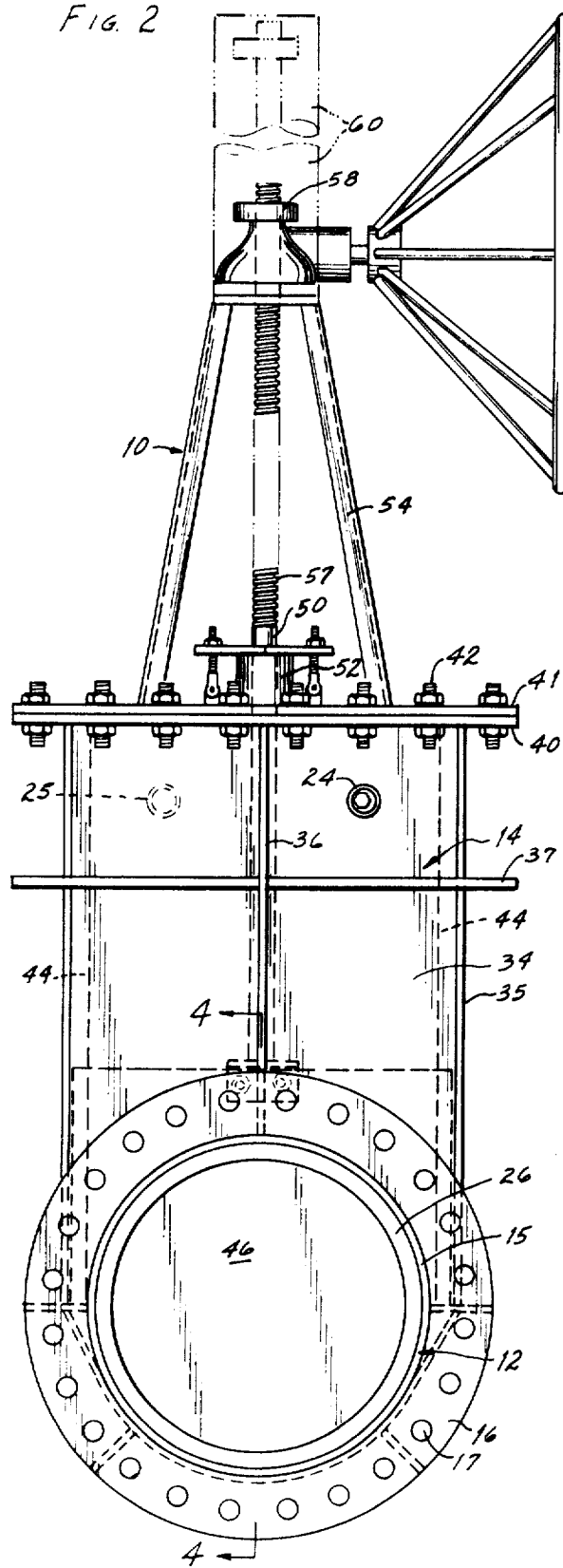
FIG. 2 is a front elevational view of the valve.

In both the embodiments of the gate as shown in FIGS. 7 and 7A, the gate 46 follows a path of travel from a first or closed position in which the gate 46 is disposed within the gate receiving slot 30 in fluid blocking relationship to a second or open position within the gate housing portion 14 substantially fully withdrawn from the cylindrical conduit portion 12. A stem 50 is attached to the gate 46 by means of a clevis 51, shown more particularly in FIG. 6. The stem 50 extends through the top flange 40 and the cap plate 41 and is made fluid tight by means of a packing gland 52 as shown in FIGS. 1 to 3.

A yoke 54 is attached to the cap plate 41 and extends vertically above the cap plate 41 to a platform which includes a stem nut 55. The stem nut 55 is of the type well known in the art and includes essentially a gear box threadably attached to the stem 50 and therefore is not illustrated in detail.

Although prior devices are known in this type of valve structure described hereinbefore, generally a hand wheel 56 is employed to drive the stem nut 55 for moving the stem nut 50 in a vertical path to thereby drive the gate along the path of travel to either the first or the second position as described hereinbefore.

The stem 50 has a threaded portion 57 for two purposes. Firstly, the threaded portion 57 threadably engages the stem nut 55 which causes vertical movement of the stem 50 and provides a means for driving the gate 46 in the described path of travel. Secondly, the threaded portion 57 receives stop nut 58 threaded onto a portion of the stem 50 above the stem nut 55.

The stop nut 58 also indicates the position of the gate 46 to be in either the first or the second position.

In the embodiment shown particularly in FIG. 1, a marker has been conveniently produced by providing a transparent stem cover 60. The stem cover 60 has markings (not shown) on the side of the cover and thereby provides a visual indication of the nut 58. The cover 60 also protects the stem nut 55 against infiltration of dust and abrasive material which might otherwise enter into the upper opening of the stem nut 55. The present invention includes purge ports 24 and 25 as found in standard practice.

In FIG. 4 the gate 46 is shown as having a tapered end 45. This tapered construction will permit the gate 46 to cut through any reasonably severable material that may lodge in front of the gate 46 as it closes.

An aliphatic elastomer such as polyurethane is the currently preferred material because of its capability of being cold set with good dimensional stability, wiping characteristics and erosion resistance. Polyurethane will seal tightly to the blade even though the blade is moving and will minimize seepage of slurry from the cylindrical conduit portion 12.

The slurry gate valve of the present invention is very effective without the polyurethane seal due to the close proximity between gate 46 and the walls of the gate receiving slot 30 and the transverse slot 46A and is only enhanced in its capabilities by the polyurethane.

In a further embodiment of the present invention shown in FIGS. 8 to 11, sleeve liner 126 includes an inner end face 126A. The inner end face 126A defines an annular channel 126B disposed within the sleeve liner 126. An undercut key portion 126C is disposed adjacent the annular channel 126B and extends radially outwardly therefrom. The annular channel 126B and undercut key portion 126C lockably receive an annular wiping seal 126D which extends outwardly from the annular channel 126B and the inner end face 126A to sealingly engage with end adjacent surface 146A of gate 146.

Similarly, the sleeve liner 128 includes an inner end face 128A. The inner end face 128A defines an annular channel 128B disposed within the sleeve liner 128. An undercut key portion 128C is disposed adjacent the annular channel 128B and extends radially outwardly therefrom. The annular channel 128B and undercut key portion 128C lockably receive an annular wiping seal 128D which extends outwardly from the annular channel 128B and the inner end face 128A and sealingly engages with an adjacent surface 146B of the gate 146.

The annular wiping seals 126D and 128D sealingly engage the surfaces 146A and 146B, respectively, of gate 146 to inhibit seepage of slurry between surfaces 146A and 146B when the gate 146 is positioned in the closed position to shut off flow of slurry through sleeves 126 and 128.

Figure 11:
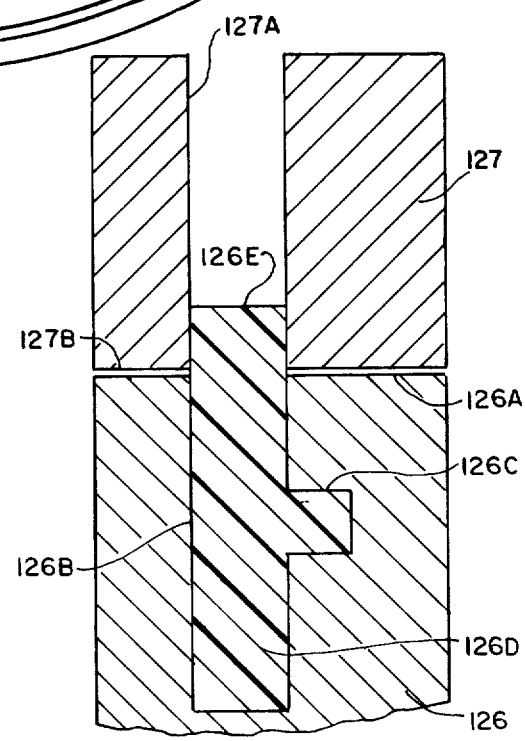
FIG. 11 is an enlarged fragmentary section of a portion of the sleeve liner, the annular wiping seal and seal forming mold of the embodiment shown in FIGS. 8 to 10.

As shown more particularly with reference to FIG. 11, a mold 127 is utilized in the forming of the wiping seals 126D and 128D. The mold 127 includes an open ended annular passage 127A and an annular planar surface 127B which defines the open ended passage 127A. The surface 127B cooperates with the inner end face 126A of the sleeve liner 126. Resinous sealant is poured through the open ended passage 127A of the mold 127 into the annular channel 126B and undercut key portion 126C until the channel 126B and the portion 126C are filled with sealant. More sealant is poured through 127A until passage 127A is partially filled. The resinous sealant is then cured and the mold subsequently removed to leave an annular wiping seal 126D lockably secured within the channel 126B and key portion 126C. The seal 126D extends outwardly from the channel 126B away from the inner end surface 126A of the sleeve liner 126. The distal end 126E of the wiping seal 126D may be then machined to provide a smooth surface to sealingly engage the surface 146A of the gate 146 when the gate is located in the closed position to shut off the flow of slurry through the valve. The method of manufacturing the wiping seal 126D described hereinbefore is identical to that of the method for manufacturing the wiping seal 128D within the sleeve liner 128.

Figure 12:
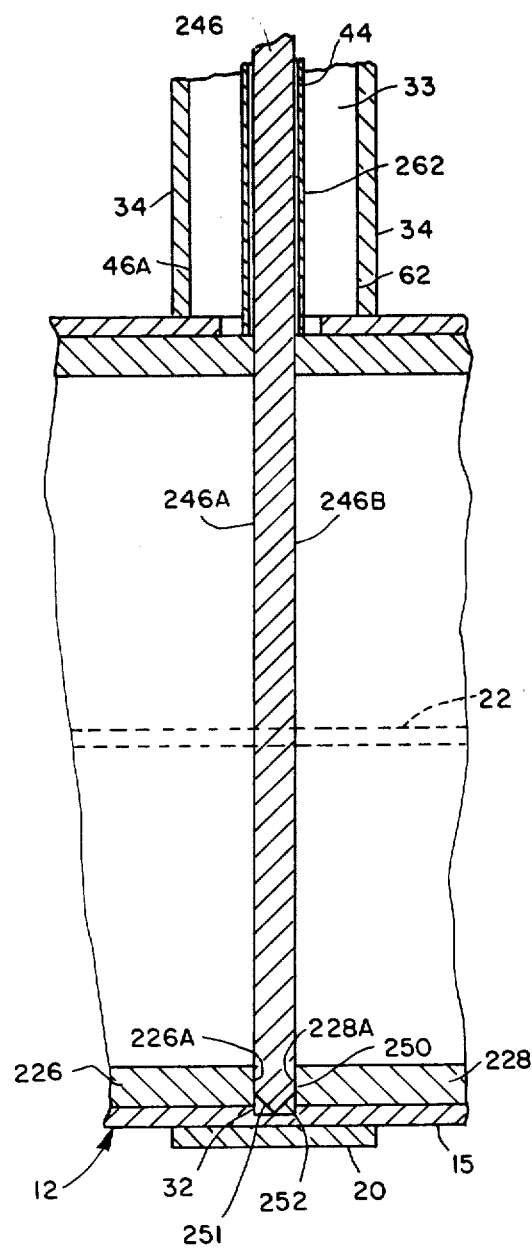
FIG. 12 is an enlarged fragmentary sectional view similar to FIG. 4 illustrating a third embodiment of the invention.

FIG. 12 is an enlarged fragmentary sectional view of a third embodiment of the invention. This embodiment is similar to FIG. 4 with similar reference numerals used for similar structural elements. In this embodiment, sleeve liners 226 and 228 have outer end faces, not shown, but similar to outer end faces 29 and 29A. The sleeve liners 226 and 228 include inner end faces 226A and 228A which are disposed immediately adjacent the opposed sides 246A and 246B of gate 246. The gate 246 moves in a manner heretofore described in two guide tracks 44 which extend to the outer periphery of sleeves 226 and 228.

The gate 246 includes a tappered end 250 having a first and a second tapper 251 and 252 to facilitate movement of the gate 246 along inner end faces 226A and 228A. The inner end faces 226A and 228A form a seal with the gate 246 as shown in FIG. 12. This embodiment provides a suitable seal for most purposes without the need of resilient sealing gaskets shown in prior embodiments. Accordingly, this gate valve provides a substantially maintenance free assembly for many installations.

The present disclosure includes that contained in the appended claims as well as that in the foregoing description. Although the invention has been described in its preferred form with a certain degree of particularity, it is understood that the present disclosure of the preferred form has been made only by way of example, that numerous changes in the details of construction and the combination and arrangement of parts may be resorted to without departing from the spirit and scope of the invention.

What is claimed is:

1. A slurry gate valve comprising in combination:
   a cylindrical conduit portion;
   a first end of said conduit portion;
   a second end of said conduit portion, said first and said second ends being in opposed relationship to each other;
   a first annular bolt flange disposed adjacent said first end of said conduit portion;
   a second annular bolt flange disposed adjacent said second end of said conduit portion;
   a first face of said first bolt flange;
   a first face of said second bolt flange;
   a plurality of bolt holes defined by said first faces of said first and said second bolt flanges;
   a first sleeve liner extending from said first face of said first bolt flange inwardly relative to said conduit portion;
   a second sleeve liner extending from said first face of said second bolt flange inwardly relative to said conduit portion;
   a first inward face of said first sleeve liner;
   a first inward face of said second sleeve liner;
   an annular slot defined by said first inward faces of said first and said second sleeve liners;
   an annular channel defined by said first inward face of said first sleeve liner;
   an annular channel defined by said first inward face of said second sleeve liner;
   an annular wiping seal disposed within each of said annular channels;
   a gate housing portion secured adjacent said conduit portion;
   a gate slidably disposed within said gate housing, said gate including a first and a second surface, said annular wiping seal of said first sleeve liner cooperating with said first surface of said gate, said annular wiping seal of said second sleeve liner cooperating with said second surface of said gate in wiping relationship thereto;
   a circular slot defined by said conduit portion, said circular slot being enclosed by said gate housing and in planar alignment with said gate and said annular slot; and
   an undercut key portion disposed adjacent each of said annular channels.

2. A slurry gate valve as set forth in claim 1 wherein said undercut key portion extends radially outwardly relative to said adjacent annular channel.

3. A slurry gate valve as set forth in claim 2 wherein each of said wiping seals is locked within said adjacent annular channel by said adjacent undercut key portion.

4. A slurry gate valve as set forth in claim 3 wherein said annular wiping seal of said first sleeve portion extends outwardly from said annular channel and sealingly engages said first surface of said gate.

5. A slurry gate valve as set forth in claim 4 wherein said annular wiping seal inhibits seepage of slurry between said first and said second surface of said gate.

6. A slurry gate valve as set forth in claim 5 wherein said annular wiping seal is a resinous sealant.

7. A slurry gate valve as set forth in claim 6 wherein said resinous sealant is a curable polyurethane.

* * * * *